Sept. 30, 1969  W. R. MARSH ET AL  3,469,787
ROCKET MOTOR THRUST NOZZLE WITH MEANS TO DIRECT
ATMOSPHERIC AIR INTO THE INTERIOR OF THE NOZZLE
Filed Sept. 7, 1966  3 Sheets-Sheet 1

INVENTORS
WALTER R. MARSH
EDWARD J. DAVIS
BY
Edwin O. Grant
ATTORNEY

Sept. 30, 1969　　　W. R. MARSH ETAL　　　3,469,787
ROCKET MOTOR THRUST NOZZLE WITH MEANS TO DIRECT
ATMOSPHERIC AIR INTO THE INTERIOR OF THE NOZZLE
Filed Sept. 7, 1966　　　　　　　　　　　　3 Sheets-Sheet 1

INVENTORS
WALTER R. MARSH
EDWARD J. DAVIS
BY
Edwin D. Grant
ATTORNEY

Sept. 30, 1969　　　W. R. MARSH ETAL　　　3,469,787
ROCKET MOTOR THRUST NOZZLE WITH MEANS TO DIRECT
ATMOSPHERIC AIR INTO THE INTERIOR OF THE NOZZLE
Filed Sept. 7, 1966　　　　　　　　　　　　3 Sheets-Sheet 3

INVENTORS
WALTER R. MARSH
EDWARD J. DAVIS
BY
Edwin D. Grant

ATTORNEY

United States Patent Office 3,469,787
Patented Sept. 30, 1969

1

3,469,787
ROCKET MOTOR THRUST NOZZLE WITH MEANS TO DIRECT ATMOSPHERIC AIR INTO THE INTERIOR OF THE NOZZLE
Walter R. Marsh, Hopatcong, and Edward J. Davis, Convent, N.J., assignors to Thiokol Chemical Corporation, Bristol, Pa., a corporation of Delaware
Filed Sept. 7, 1966, Ser. No. 579,798
Int. Cl. B64d 33/04; B64c 15/10; B64g 1/00
U.S. Cl. 239—127.3                4 Claims

ABSTRACT OF THE DISCLOSURE

A thrust nozzle for a rocket motor wherein provision is made for low altitude operation at high efficiency. The nozzle's exit cone is constructed with an opening and a shroud radially spaced therefrom. The aft end of the cone has a scoop which is opened to permit atmospheric air to enter thereinto, which in turn mitigates or eliminates the deleterious effects of thrust gas separation at the nozzle wall while the motor is operating within the atmosphere.

---

This invention relates to rocket motors and, more particularly, to rocket motor thrust nozzles having increased efficiency under different operating conditions.

Because of design considerations relating to pressure, the thrust nozzle of a rocket motor intended for operation within the atmosphere has a lower expansion ratio than that of a rocket motor intended for operation in space. If a rocket motor designed for use at comparatively low altitudes is operated in the upper regions of the atmosphere or in space, its performance will not be as high as that of a rocket motor having a thrust nozzle with a higher expansion ratio. On the other hand, a rocket motor with a thrust nozzle having a high expansion ratio will suffer loss of thrust when operated in the lower regions of the atmosphere, this loss resulting from flow separation in the thrust nozzle (i.e., movement of the boundary of the gas stream flowing through the thrust nozzle away from the wall of the latter). If this loss of thrust as a result of flow separation could be compensated, a substantial increase in payload or velocity capability could be realized in launch vehicles which pass through all levels of the atmosphere.

A plug nozzle is partially altitude compensating in that the flow of thrust gas around the plug does not separate (although the outer edge of the gas stream seeks its own boundary). The spike portion of a plug nozzle provides a surface to which the gas stream will stay attached at all altitudes, and thus this surface and the free boundary of the gas stream provide for full gas expansion at all altitudes up to the maximum altitude for which the spike is designed. However, a plug nozzle does not utilize all of the thrust potential of a gas stream, since the outer boundary of the gas stream is not pushing on any part of the vehicle when it expands. At higher altitudes, a bell nozzle in which the gas stream is fully expanded provides better performance than a plug nozzle, but the problem associated with the use of such a thrust nozzle is that of preventing, or minimizing, separation of the gas stream from the inner surface of the nozzle at lower altitudes. The present invention provides a solution to this problem, as well as other advantages which will become manifest hereinafter.

It is accordingly an object of this invention to provide an improved rocket motor thrust nozzle.

2

Another object of the invention is to provide a rocket motor thrust nozzle in which there will be full flow of thrust gas throughout the altitude range.

Still another object of the invention is to provide a rocket motor thrust nozzle wherein atmospheric air can be utilized to effect combustion of fuel-rich thrust gas.

A further object of the invention is to provide a rocket motor thrust nozzle wherein atmospheric air can be introduced to increase thrust by mass addition.

These and other objects of the invention are attained by rocket motor thrust nozzles comprising a throat portion and an aft portion integrally joined to said throat portion, said aft portion having at least one opening in the wall thereof through which atmospheric air can enter the thrust nozzle at points spaced circumferentially thereof. One preferred thrust nozzle in accordance with the invention has a plurality of circumferentially-extending, longitudinally-spaced slots formed in the wall of the exit cone thereof. Another preferred thrust nozzle in accordance with the invention has a plurality of apertures formed in the wall of the exit cone thereof, and is provided with means for selectively admitting or blocking the flow of atmospheric air into, or the flow of exhaust gases from, the thrust nozzle through said apertures.

The invention will be explained in detail in the following specification, in which reference is made to the accompanying drawings wherein.

Throughout the specification and drawings like reference numbers refer to like parts.

Figure 1:
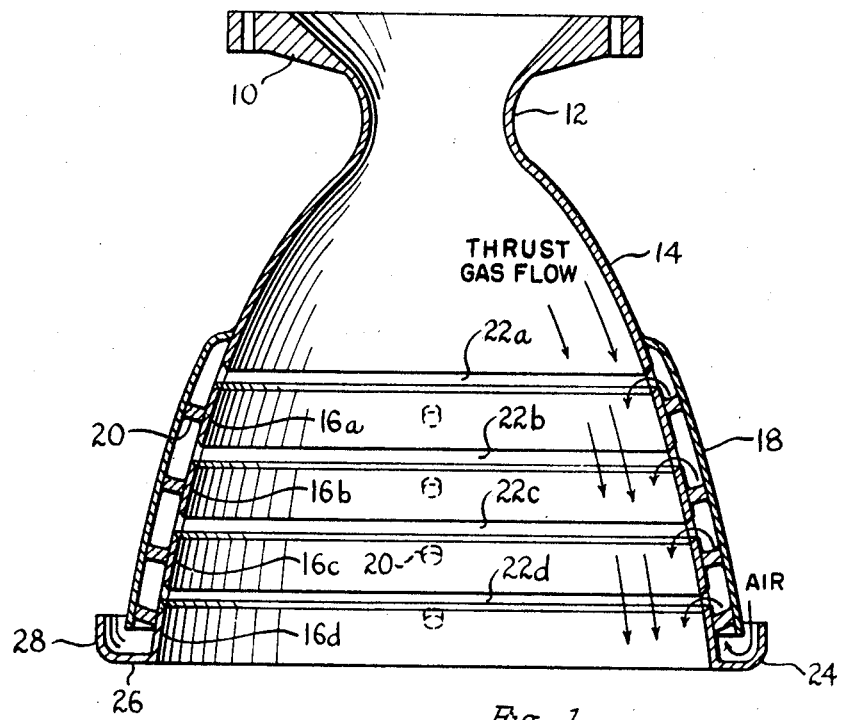
FIGURE 1 is a longitudinal sectional view illustrating a rocket motor thrust nozzle in accordance with the invention.

As illustrated in FIGURE 1, one preferred rocket motor thrust nozzle in accordance with the invention comprises a bolt flange 10 by means of which the nozzle can be attached to a rocket motor casing, a throat portion 12 integrally joined to said flange, and an exit cone integrally joined to said throat portion and formed of a forward section 14 and a plurality of aft sections 16a through 16d disposed in tandem. More particularly, the illustrated thrust nozzle is provided with an annular shroud 18 the forward end of which is joined to the forward section 14 of the nozzle exit cone, and the aft sections 16 are held in fixed, coaxial relation within this shroud by means of a plurality of columnar, circumferentially spaced supports 20 that position the aft sections evenly from said shroud. Thus the thrust nozzle has a plurality of circumferentially extending, longitudinally spaced slots 22a through 22d formed in the wall thereof. Fixedly mounted on the rearmost section 16d of the thrust nozzle is a circumferentially extending air scoop 24 which comprises an outwardly projecting portion 26 and an integral forwardly projecting portion 28 evenly spaced from the periphery of shroud 18.

It will be recognized by persons who are skilled in the art of rocket motors that the components of the above-described thrust nozzle can be made of many different materials well-known in the art. For example, all components of the thrust nozzle can be made of heat-resistant metals, and in some instances it may be advantageous to construct the nozzle wall of plastic laminated material of the type utilized heretofore in lightweight thrust nozzles. If desired, cooling coils may be wound around the throat portion 12 and the forward section 14 and aft sections 16 of the thrust nozzle.

Figure 2:
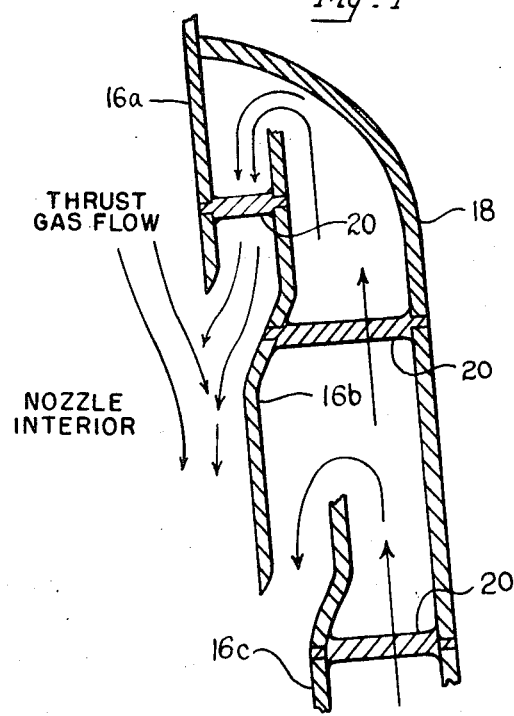
FIGURE 2 is a sectional view of a modification of certain components of the thrust nozzle of FIGURE 1.

The expansion ratio of a rocket motor thrust nozzle having the construction illustrated in FIGURE 1 can be selected to provide for full-expansion of the thrust gas discharged through the thrust nozzle at a particular high altitude. At a lower altitude within the atmosphere, separation of the exhaust gas stream from the wall of the thrust nozzle, such as would occur under the same conditions in a conventional thrust nozzle having the same expansion ratio, is compensated for by flow of air through one or more of the slots 22a through 22d, the amount of air that flows into the interior of the thrust nozzle depending upon the pressure differential that develops across the walls of the aft sections 16a through 16d of the thrust nozzle, and also depending upon the aspirating effect of the slots. The aspirating (or pumping) tendency of the slots is enhanced in embodiments of the invention having thrust nozzles constructed as illustrated in FIGURE 2, wherein successive aft sections 16 of the thrust nozzle have their forward edges spaced outwardly from the rear edge of the preceding aft section. The thrust gas expands more rapidly in the area of the offset edges of the aft sections, resulting in a corresponding local decrease in pressure at the slots and an increase in the aspirating effect. Air flowing into the thrust nozzle is expanded by the high temperature exhaust gas and augments the thrust of the rocket motor with which the thrust nozzle is employed. Furthermore, the exhaust gas of many rocket motors contains unburned fuel, and air which flows into the thrust nozzle at a lower altitude adds to thrust by supplying oxygen for combustion of at least a portion of this fuel.

Figure 3:
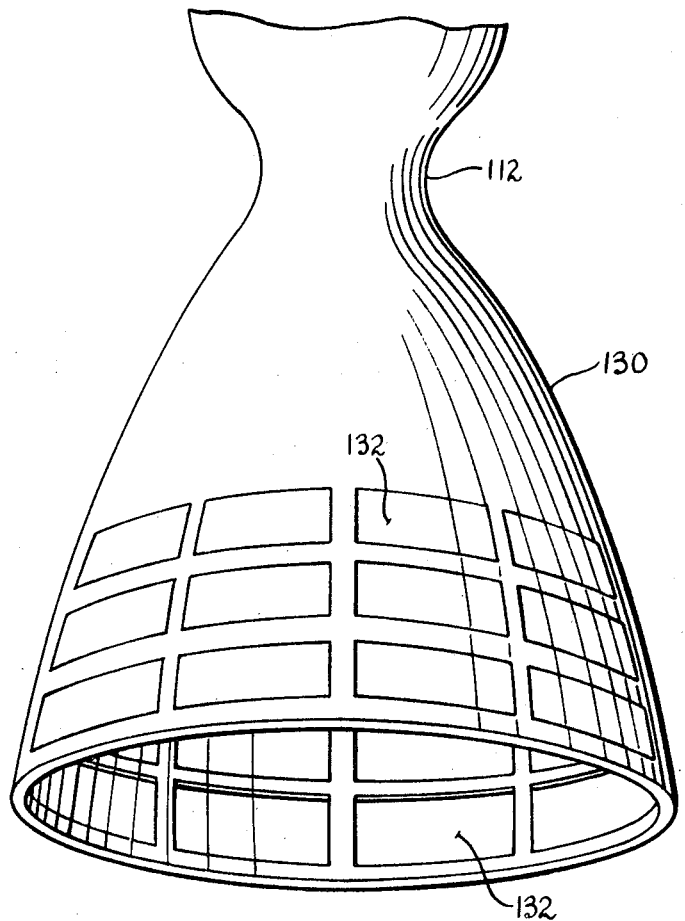
FIGURE 3 is a pictorial view illustrating a second rocket motor thrust nozzle in accordance with the invention.
Figure 4:
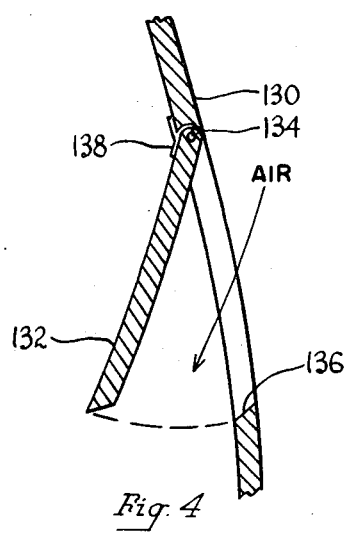
FIGURE 4 is a sectional detail view of components of the thrust nozzle illustrated in FIGURE 3.

In another embodiment of the invention which is illustrated in FIGURES 3 and 4, a thrust nozzle is formed with a throat portion 112, an exit cone 130, and a plurality of closure members or flaps 132 each of which is pivotally connected by means of a pivot pin 134 (see FIGURE 4) to the thrust nozzle at its forward end so as to be movable between a first position thereof wherein it closes a respective one of a plurality of apertures 136 (one of which is illustrated in FIGURE 4) and a second position thereof wherein it is pivoted inwardly from the wall of the thrust nozzle to thereby open the same aperture. As illustrated in the drawing, the apertures 136 in exit cone 130 are arranged in three circumferentially extending rows, the apertures in each row being evenly spaced apart. In addition, the apertures are arranged in longitudinally extending columns of three apertures each. A flexible shield 138 (illustrated in FIGURE 4 only) is attached to the inner surface of exit cone 130 adjacent the forward edge of each aperture 136 therein and extends over the forward edge portion of the flap 132 in the aperture, thereby protecting the pivot joint of the flap from solid particles which may be in the thrust gas passing through the thrust nozzle.

If the thrust nozzle illustrated in FIGURES 3 and 4 is employed at an altitude in the atmosphere below that for which there is full expansion of the exhaust gas discharged therethrough, expansion of the exhaust stream causes a pressure differential across the wall of the thrust nozzle, whereupon the flaps 132 open and air enters the thrust nozzle through apertures 136. The number of flaps which open depends upon the extent of separation (longitudinally of the thrust nozzle) of the exhaust stream flowing through the thrust nozzle from the wall of said thrust nozzle. As in the operation of the first described embodiment of the invention, air which flows into the thrust nozzle illustrated in FIGURES 3 and 4 compensates for thrust loss that would otherwise result from the separation of the exhaust stream from the wall and also increases thrust as a result of its being heated by the high temperature exhaust gas. The air introduced into the thrust also provides oxygen for combustion of any unburned fuel in the portion of the exhaust stream adjacent the wall of the thrust nozzle.

Figure 5:
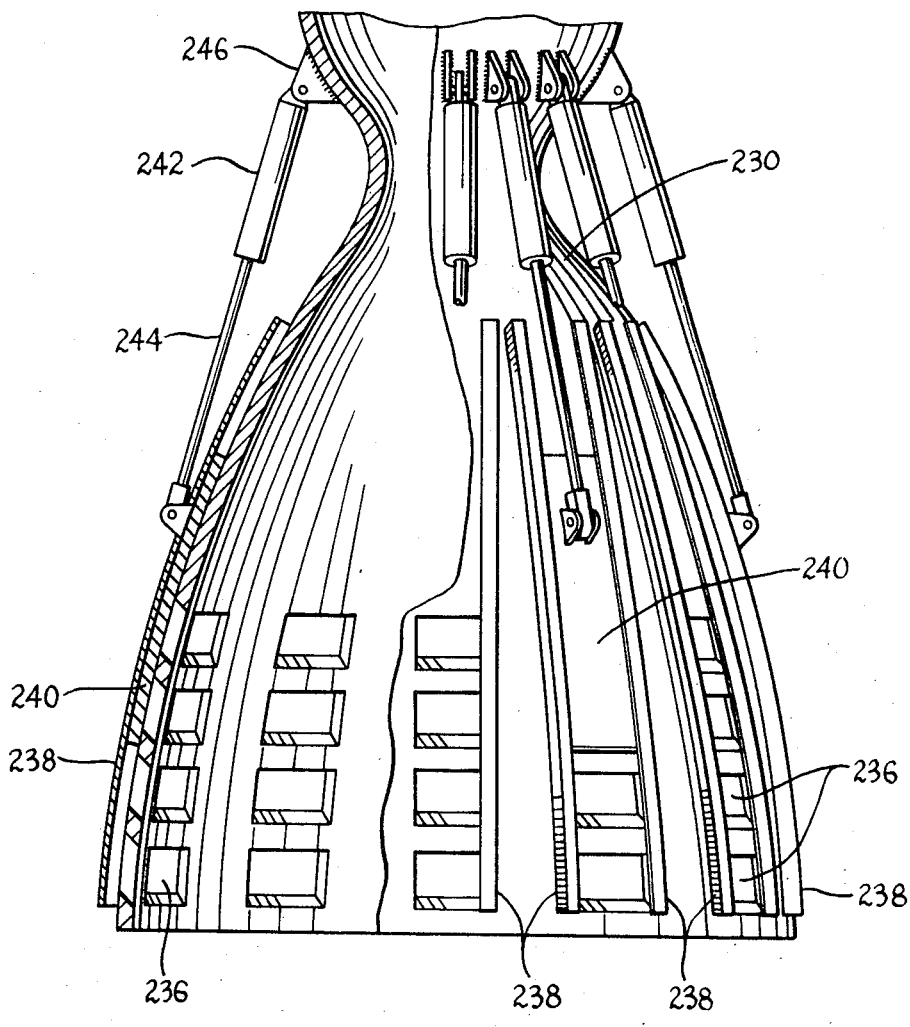
FIGURE 5 is a partially sectional view of a third rocket motor thrust nozzle in accordance with the invention.

FIGURE 5 illustrates a third embodiment of the invention that comprises an exit cone 230 formed with a plurality of apertures 236, these apertures being arranged in circumferentially extending rows and longitudinally extending columns. Extending longitudinally of each column of apertures are two guide rails 238, each of which has an L-shaped cross-section one leg of which is fixed joined to exit cone 230 and the other leg of which is substantially parallel with the outer surface of said exit cone. A rectangular plate or cover 240 is slidably disposed between the pair of guide rails 238 for each column of apertures, this cover being movable longitudinally of the thrust nozzle so that it can cover or uncover the apertures in the column. Movement of each of the covers 240 is effected by means of a hydraulic actuator 242 the drive shaft 244 of which is pivotally connected to the cover and the cylinder of which is pivotally connected to a lug 246 fixedly joined to the wall of the thrust nozzle. The actuators 242 are operably connected to conventional pressurizing means (not shown) which can be selectively operated to extend or retract the drive shafts 244.

It will be understood from the foregoing description of the third embodiment of the invention that atmospheric air can be admitted into the interior of exit cone 230 through the apertures 236 therein whenever there is separation of the exhaust stream from the inner surface of the exit cone. If such separation occurs only at the area adjacent the rearmost row of apertures 236, the actuators 242 can be operated to move the covers 238 to a position uncovering only this row of apertures. Other rows of the apertures are uncovered as the line of separation of the exhaust stream from the wall of the thrust nozzle moves forward. As in the operation of the previously described embodiments of the invention, introduction of atmospheric air into the exit cone of the thrust nozzle illustrated in FIGURE 5 compensates for thrust loss that would otherwise result from the separation of the exhaust stream from the wall of the thrust nozzle. Also, as previously described, the improvement in thrust due to mass addition, heating of the air, and combustion of fuel-rich combustion products will occur.

It will thus be seen that the objects of this invention are achieved by the described and illustrated thrust nozzles, all of which are of lightweight, uncomplicated construction and thus readily manufactured at minimum expense. Obviously many modifications of the disclosed embodiments can be made without departing from the concepts of the invention, and it is therefore to be understood that the scope of the invention is limited only by the terms of the appended claims.

What is claimed is:

1. A rocket motor thrust nozzle including an integral exit cone of longitudinally diverging cross-section comprising a shroud disposed around said exit cone in spaced coaxial relation therewith defining an annular space therebetween, the forward end of said shroud being joined to said thrust nozzle and the aft end of said shroud being attached to the aft end of said exit cone, a circumferentially extending air scoop mounted on the aft end of said thrust nozzle radially extendable beyond said shroud communicable with said annular space and means defining at least one continuous circumferential opening in the wall of said exit cone whereby air from said air scoop is directed through said space and then interiorly of said exit cone.

2. The thrust nozzle of claim 1 wherein the opening is a slot.

3. The thrust nozzle of claim 1 wherein the opening is disposed in the exit cone so that air passing therethrough into the interior of said exit cone is directed aftwardly.

4. The thrust nozzle of claim 2 wherein the slot is disposed in said exit cone with its forward outside edge spaced inwardly of its aftward inside edge.

References Cited

UNITED STATES PATENTS

| | | | |
|---|---|---|---|
| 2,955,418 | 10/1960 | David et al. | 239—265.17 |
| 2,959,917 | 11/1960 | McGehee | 239—265.17 |
| 3,020,713 | 2/1962 | Bertin et al. | 239—127.3 |
| 3,048,973 | 8/1962 | Benedict | 239—127.3 |

WALTER SOBIN, Primary Examiner

U.S. Cl. X.R.

239—265.17